(12) United States Patent
Burkhardt

(10) Patent No.: US 7,814,632 B2
(45) Date of Patent: Oct. 19, 2010

(54) METHOD FOR BREAK SEPARATION OF PIECES THAT CAN BE RE-ASSEMBLED OR THEIR STARTING MATERIALS

(75) Inventor: Wolfgang Burkhardt, Ansbach (DE)

(73) Assignee: MAN Nutzfahrzeuge AG (DE)

( * ) Notice: Subject to any disclaimer, the term of this patent is extended or adjusted under 35 U.S.C. 154(b) by 1022 days.

(21) Appl. No.: 11/112,613

(22) Filed: Apr. 22, 2005

(65) Prior Publication Data

US 2005/0236455 A1    Oct. 27, 2005

(30) Foreign Application Priority Data

Apr. 24, 2004    (DE)    ........................ 10 2004 020 063

(51) Int. Cl.
  *B23P 17/00*    (2006.01)
  *B26F 3/02*    (2006.01)
(52) U.S. Cl. ........................ 29/417; 29/888.09; 225/103
(58) Field of Classification Search .................. 29/413, 29/414, 415, 417; 225/2, 96, 96.5, 103
  See application file for complete search history.

(56) References Cited

U.S. PATENT DOCUMENTS

| | | | | |
|---|---|---|---|---|
| 1,209,250 A | * | 12/1916 | Bellanger | .................... 148/201 |
| 1,366,063 A | * | 1/1921 | Culhane, Jr. | .................... 225/2 |
| 2,630,174 A | * | 3/1953 | Poteet | ............................ 225/2 |
| 3,845,895 A | * | 11/1974 | Nakahara | .................... 225/93.5 |
| 4,970,783 A | | 11/1990 | Olaniran et al. | |
| 6,176,115 B1 | | 1/2001 | Van Ryper et al. | |

FOREIGN PATENT DOCUMENTS

| | | |
|---|---|---|
| DE | 10137975 | 2/2003 |
| EP | 0396797 | 11/1990 |

* cited by examiner

*Primary Examiner*—David P Bryant
*Assistant Examiner*—Alexander P Taousakis
(74) *Attorney, Agent, or Firm*—Robert W. Becker; Robert Becker & Associates

(57) ABSTRACT

A method for break separation of pieces that can be re-assembled or their starting materials achieves a break separation at a selected break surface. The method includes subjecting a piece to be subjected to break separation to a break force $F_3$, $F_3'$ perpendicular to the selected break surface. Also, the method includes applying, before the time at which the piece is subjected to the break force $F_3$, $F_3'$, a compressive force $F_1$-$F_6'$ to the piece in a manner such that a tensile stress is produced whose maximum occurs perpendicular to the plane of the break surface, the level of stress produced is below the elastic limit of the material of the piece, and the compressive force $F_1$-$F_6'$ continues at least until the piece is first subjected to the break force $F_3$, $F_3'$.

6 Claims, 4 Drawing Sheets

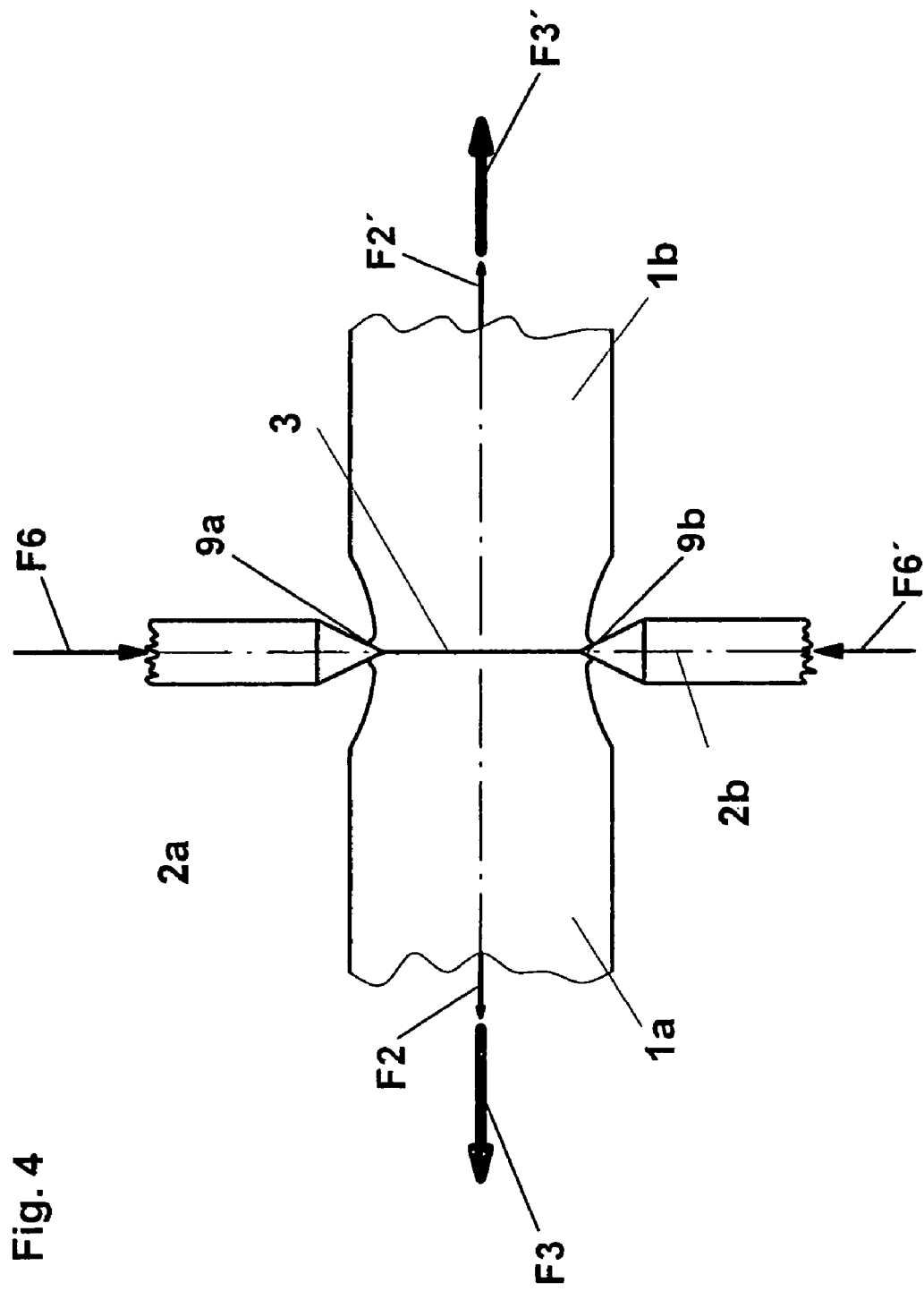

METHOD FOR BREAK SEPARATION OF PIECES THAT CAN BE RE-ASSEMBLED OR THEIR STARTING MATERIALS

BACKGROUND OF THE INVENTION

The instant application should be granted the priority date of Apr. 24, 2004, the filing date of the corresponding German patent application 10 2004 020 063.7.

The present invention relates to a method for break separation of pieces that can be re-assembled or their starting materials.

In connection with the separation of re-assemblable pieces or their starting materials, break separation has emerged as the preferred method for effecting such separation in those areas involving a high degree of junction precision, in conjunction with an economical manufacture, such as, for example, in the combustion engine area, the separation of the connecting rod bearing cover from bearings or the crankshaft bearing cover from the bearing cover housings.

The break separation is effected via differing working steps involving the pieces, with these working steps always following the same technical method course. Initially, a groove is configured into the piece to be subjected to break separation, whereby the groove partially or completely follows the desired path of the break line along the contour of the piece. The configuring of the groove into the piece can be effected in various ways; the literature provides extensive information in this connection. The thus-produced groove has the purpose of initiating the separation along the separation path upon the application of the forces that effect the break separation of the piece. The actual break separation then follows in a manner in which a force is applied perpendicular to the desired break surface, this force breaking the piece at the desired location. In practice, however, it has come about that the actual break path very frequently deviates from the desired break path. The causes therefor are multi-fold. One cause can be traced to the material itself, brittle molded materials being better suited for break separation than ductile materials, examples of which are forged piston rods. In addition to the material itself, latent stresses, impurities, or non-homogeneity of the basic piece can be causes of an unsatisfactory break process.

It is known, for example from DE 100 22 884, that, to favorably influence the breakage, the break region can be made brittle through a thermal treatment locally limited relative to the remainder portions of the piece in the course of a structure transformation, this treatment leading to a local, multi-axial stress condition. This embrittlement can be effected in various ways. In connection with expanded laser grooves such as are described, for example, in DE 196 17 402 A1, the desired break line is melted along the material, and the melt remainder is blown away or vaporized so that there results a through groove or a line of serially arrayed blind holes. The edge regions of the groove or the holes are embrittled via the formation of corresponding structures because the heat is conducted away very rapidly from the very small deposition or melted area into the remainder portions of the piece. The multidimensional stress conditions connected with the embrittlement can lead to microscopic hard tears which are in fact, desired, but which nonetheless, like the stress conditions, run into selected angles along the desired break line and cause, like the stress conditions, a "wandering away" of the break line, if the break is initiated via application of the break separation force.

It is further known from EP 0 661 125 A1 that, to favorably influence the break, a force is initially applied in the direction of the break separation force that will later be applied to the piece, whereby this pre-stress force lies below the elastic limit of the pieces to be separated. In this manner, the force that is necessary for the actual separation can be minimized, which sets the stage for achieving the steepest possible slope (rate of rise) of the actual break force to be applied. The steep slope influences the initiation of the break and the break path in a positive manner but, however, in ensuring that the static pre-stress is effective in relatively large regions of the piece, it cannot preclude the wandering away of the break line from the desired path that results from the above-described causes.

SUMMARY OF THE INVENTION

In improving upon the above-noted state of the art, it is an object of the invention to provide a method for separating re-assemblable pieces or their starting materials that, on the one hand, substantially prevents the deviation of the actual break line from the desired path and, on the other hand, permits a pre-stress to be applied to the piece to be subjected to break separation in the effective direction of the break forces.

In arriving at the solution offered by the present invention, it was assumed that the portions of the pre-stress that positively influence the break are only those portions that are effective in the desired break surface, such portions of the prestress being necessarily created in any event along with the stress conditions resulting from the conventional production of the pre-stress but which are, however, not effective for positively influencing the break path. It was therefore sought to find a possibility to produce a tensile pre-stress that would be effective substantially only on the desired break surface, perpendicular thereto. Pursuing this approach, it was found that the desired tensile stress permits itself to be created perpendicular to the desired break surface if a force is applied to the piece to be subjected to break separation that results in a compressive—or bending—stress at its maximum in the plane of the desired break surface. The desired tensile stress perpendicular to the break plane is predetermined by the material-dependent transverse construction that, in connection with steel, is a relationship of the transverse stress to the longitudinal stress of approximately 0.3. In the presumed case, this means that steel is presumed as the material, wherein the compressive stress in the break plane is perpendicular to the tensile stress in a ratio of 1:0.3. Aside from a slight deformation of the top surface, the force to be applied to the piece does not plastically deform the piece to be subjected to break separation, and can be a statically- or dynamically-effective force.

The advantage of the inventive method is that the maximum of the thus-produced tensile stress lies in the desired break surface which, on the one hand, produces a groove effect and, on the other hand, results in a pre-stress perpendicular to the desired break surface that reduces the force necessary for the actual separation, whereby, again, the stage is set for a high slope of the break force.

Due to the fact, as already noted, that the effect of the tensile stress to be applied for the breakage of the piece to be subjected to break separation corresponds to the effect of a groove, the configuring of grooves, and/or the production of a groove effect via structure transformation, can be partially or wholly avoided via suitable materials. On the other hand, if the subject material is very ductile with poor break separation properties, the deployment of conventional groove methods that have been previously noted, with the additional implementation of the inventive method, permits the limits within which a break separation is even possible to be clearly expanded.

The tensile stress to be applied in connection with the present invention can be produced via compression forces that engage the piece in various ways in order to achieve the desired effect. Thus, it is possible to apply the compression force via one or several sharp edged wedges that engage the desired break line at least partially therealong. In this manner, the compression abutment in opposition to the wedges can be configured in the form of identically configured wedges, or can be formed, as well, of flat supporting surfaces. The effect of the applied compression force is all the better the larger the portion of the desired break line upon which the compressive force is applied.

Furthermore, it is possible in an advantageous manner to apply the compressive force on the piece to be subjected to break separation via a shear arrangement. The shear arrangement engages the piece in a manner such that the maximum of the compressive stress lies in the plane of the desired break surface. In this connection, the shear arrangement can be implemented via shear edges disposed in opposition to one another that lie along a portion of the perimeter line on the piece.

A further simple and, therefore, advantageous possibility lies in the application of the compression force on the piece to be subjected to break separation by means of a bending assembly.

In the event of an application of a dynamic compressive force with one of the above-noted arrangements, this is to be effected such that the maximum of the produced tensile stress occurs substantially contemporaneously with the maximum of the actual break force.

Advantageous embodiments of the inventive method are described hereinafter with reference to the figures of the drawings.

BRIEF DESCRIPTION OF THE DRAWINGS

FIG. 4 is a side elevational view of a piece to be subjected to a break separation in accordance with the inventive method in which the compressive force is to be applied via wedges with contemporaneous slight top surface deformation.

DETAILED DESCRIPTION OF THE PREFERRED EMBODIMENTS

The method for break separation is explained hereinafter with reference to a probe body that serves to simplify the explanation. As is to be understood, the inventive method can be deployed on all pieces that are suitable for a break separation. A preferred area of use is the break separation of bearing arrangements such as, for example, piston rod bearings or crankshaft bearings of combustion engines.

Figure 1:
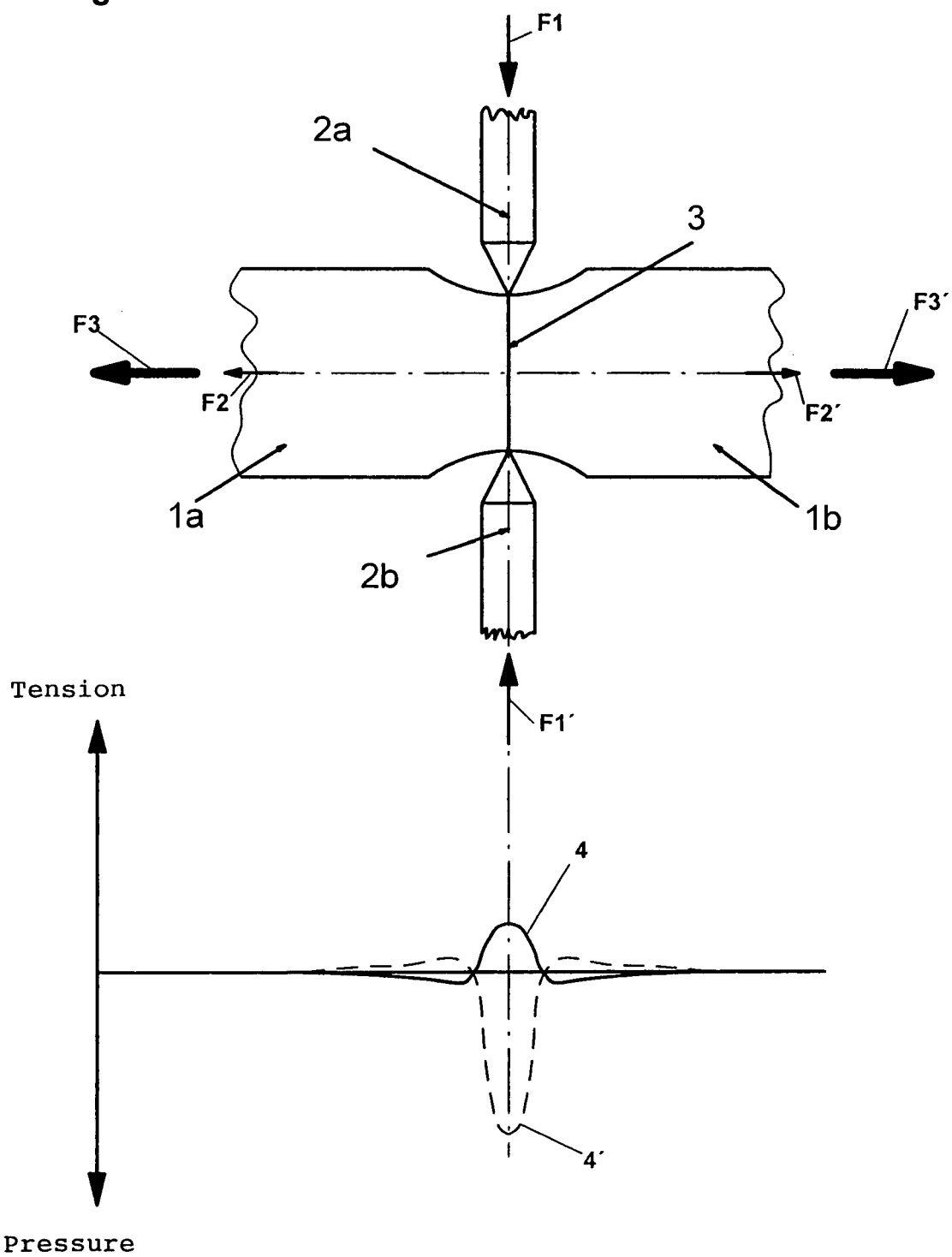
FIG. 1 is a side elevational view of a piece to be subjected to a break separation in accordance with the inventive method in which the compressive force is applied via wedges.

A piece 1 is shown in a side elevational view in FIG. 1, the piece 1 being a piece that is to be subjected to break separation. The break should thus follow along the desired break line 3. In order to achieve this, initially a compressive force is applied to the piece 1 via two wedges 2a, 2b. The wedges 2a, 2b are applied in this connection either in a single point manner or a linear line manner with a sharp peak or edge on the desired break line 3—that is, the perimeter line of the desired break surface. The wedges are thus arranged relative to one another on oppositely disposed sides of the piece 1 so that the maximum of the produced compressive stress lies in the plane of the desired break surface, this consequently resulting in a tensile stress effective in a direction perpendicular to the plane of the desired break surface. In this connection, it is advantageous if the portion of the desired break line that is impacted by the wedges 2a, 2b is as large as possible as measured relative to the entire length of the desired break line 3. It is further advantageous to permit the wedges 2a, 2b, to engage the break line 3, where, by reason of the constructive features, a deviation of the actual break line from the desired break line 3 is to be expected or can be established via trial and experimentation. The application of the compressive forces by means of the wedges 2a, 2b can be effected in a manner such that both wedges 2a, 2b are driven with the same force actively against the piece by means of a drive (not illustrated). It is, however, of course possible to apply the force via the drive of only the first wedge 2a, while the second wedge 2b serves as a passive abutment. It is equally imaginable that the wedge 2b serving as the abutment can be replaced by a support surface (not illustrated) serving as an abutment or that a clamping (not illustrated) of the piece can be deployed in lieu of the abutment function.

In connection with the hereinafter following discussion of the relationships of the forces or, respectively, the stresses, on the piece 1, it is assumed that a force $F_1$, $F_1'$ is applied by the wedges 2a, 2b, respectively, on the piece 1. A compressive stress path 4' in the piece 1 that is illustrated in FIG. 1 results from the forces $F_1$ and $F_1'$. The maximum of the compressive stress path 4' is reached in the plane in which the forces $F_1$, $F_1'$ are effective—that is, in the desired break surface. The tensile stress produced via the compressive stress and effective perpendicular thereto follows the tensile stress path 4 and represents, on the one hand, a loading of the piece 1 that corresponds to the effect of a groove in the direction of the desired break surface, and, on the other hand, a loading of the piece 1 whose effect would correspond to that exerted by a pre-stress in a direction perpendicular to the desired break surface, if such pre-stress were to be generated by imaginary forces $F_2$, $F_2'$, with the difference that the imaginary forces $F_2$, $F_2'$ would be produced, in this stress condition, in the entirety of the piece 1 and not only in a small portion in the immediate environment of the desired break surface.

The execution of the break separation in connection with the above-described arrangement occurs such that, initially, the forces $F_1$, $F_1'$ generated via the wedges 2a, 2b are applied along a portion of the break line 3 of the piece 1 that is to be subjected to break separation. In this stress condition, the actual break forces $F_3$, $F_3'$ are then applied perpendicular to the desired break surface on the piece 1, such forces tearing the piece 1 along the break line 3 into the portions 1a, 1b.

Via the stress condition in the region of the desired break surface, start tears that initiate the breakage are formed such that they follow the maximum of the stress, whereby a wandering away of the break surface into other regions of the piece 1 is substantially prevented. The stress condition of the piece 1 during the separation process reduces, moreover, the force necessary to effect the breakage, whereupon this can, as has been already described, be exploited in order to increase the rate of rise of the slope of the forces $F_3$, $F_3'$. In a variation of the above-described course, the forces $F_1$, $F_1'$ can also be applied in a dynamic process while the breakage process is occurring—that is, contemporaneous with the application of the break forces $F_3$, $F_3'$ on the piece 1. In this connection, attention is to be paid that the forces $F_1$, $F_1'$ and the break forces $F_3$, $F_3'$ reach the break separation effective maximum at substantially the same time.

Figure 2:
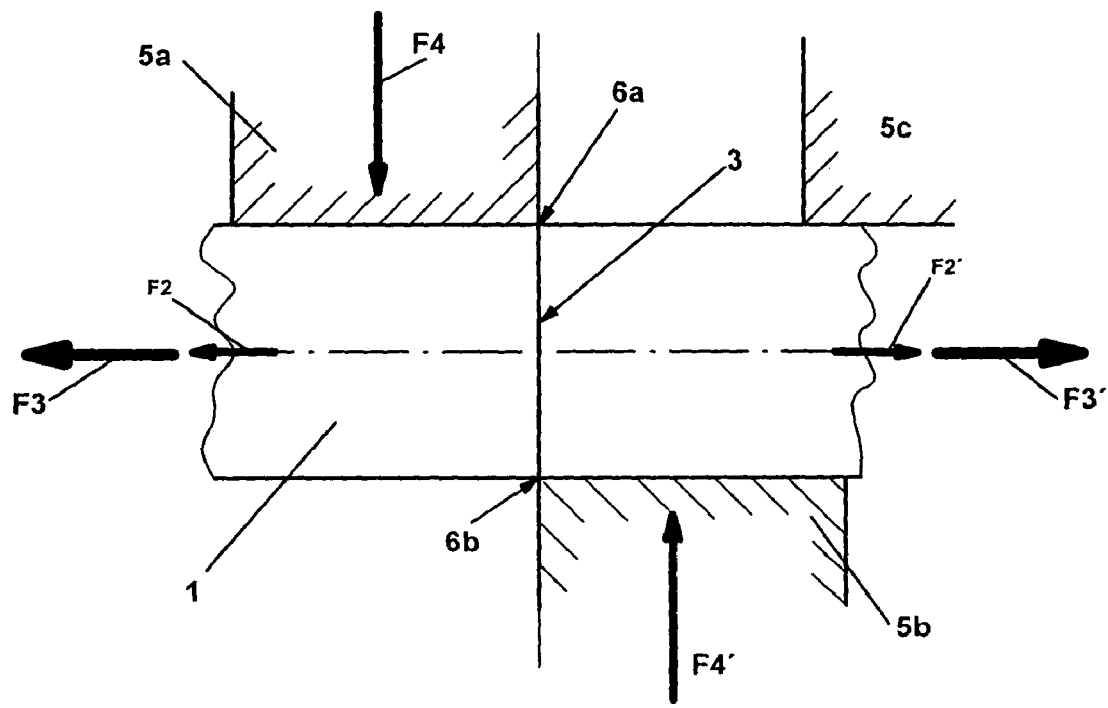
FIG. 2 is a side elevational view of a piece to be subjected to a break separation in accordance with the inventive method in which the compressive force is to be applied via a shear arrangement.

FIG. 2 illustrates another possibility to apply a compressive stress, in the area of the break surface, on the piece to be subjected to break separation. A shear arrangement comprised of two shear plates 5*a*, 5*b* and an abutment 5*c* engage with their shear edges 6*a*, 6*b* along a portion of the break line 3 that here, as well, corresponds to the perimeter line of the desired break surface. Forces $F_4$, $F_4'$ are applied on the piece 1 by the shear plates 5*a*, 5*b* such that a compressive stress is produced that has its maximum in the region of the desired break surface. The tensile stress created via the compressive stress has the same effects as have been described in connection with FIG. 1, in that, on the one hand, a groove effect in the break plane is produced and, on the other hand, a pre-stress perpendicular to the break plane is produced. Also, the breakage process itself is not different than that described in FIG. 1 so that the description set forth with respect to FIG. 1 can be referred to for further information. Additionally, in this application, it is possible to apply the shear forces $F_4$, $F_4'$ in a static or dynamic manner in a manner analogous to that described already with respect to FIG. 1.

Figure 3:
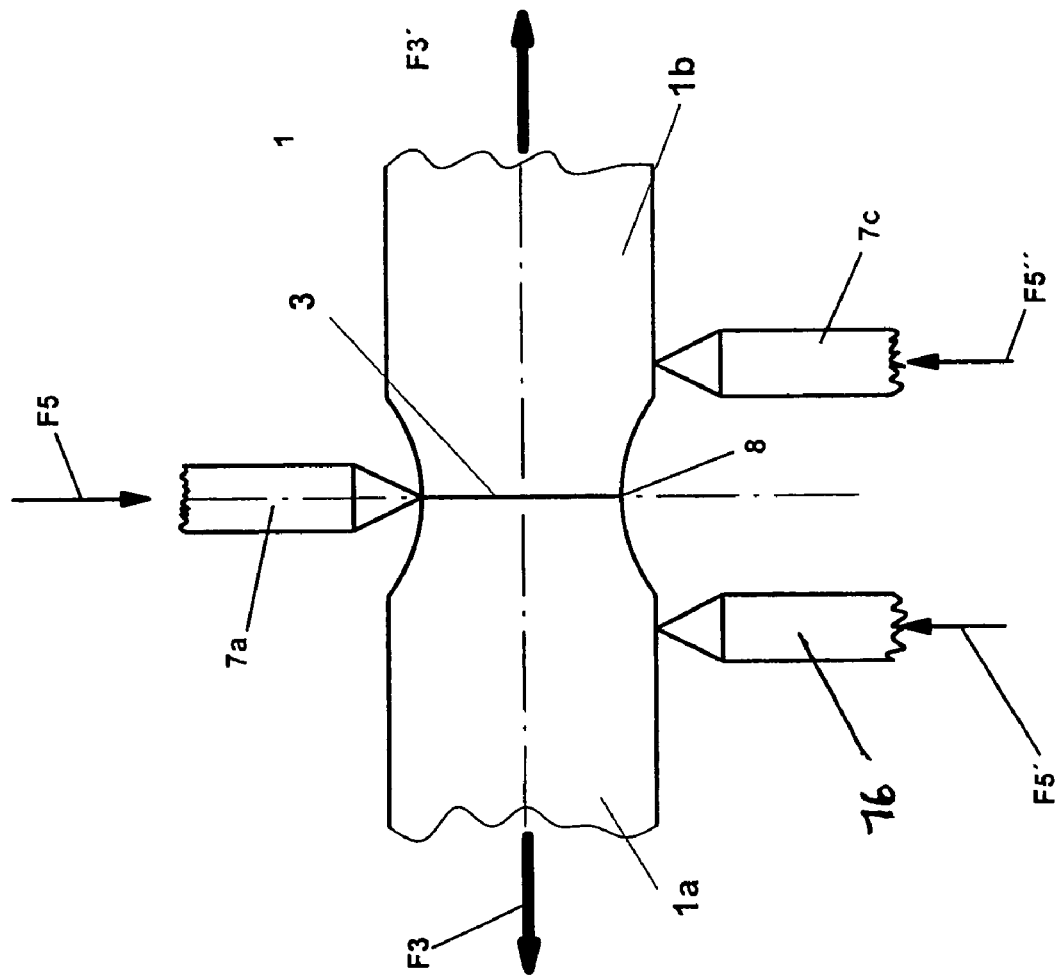
FIG. 3 is a side elevational view of a piece to be subjected to a break separation in accordance with the inventive method in which the compressive force is to be applied via a three-point bending assembly.

To produce the desired stress conditions, in addition to the production thereof via a pure compressive stress, as has been described with respect to the examples illustrated in FIGS. 1 and 2, there is also the possibility to achieve the corresponding effect via a bending assembly. FIG. 3 illustrates an assembly for subjecting the noted exemplary piece 1 to a three-point bending loading. In this connection, a compressive force $F_5'$ is applied in the direction of the plane of the desired break surface via a sharp edged wedge 7*a* that engages the piece 1 along a portion of the break line 3. Two wedge-shaped supports 7*b*, 7*c* are disposed respectively on both sides of the break line 3 in opposition to the wedge 7*a* at equal spacings therefrom such that opposition forces $F_5'$ and $F_5''$ in opposition to the compressive force $F_5'$ are exerted on the piece 1. Via the noted forces relationships, a bending stress is produced in the piece 1 whose maximum is reached opposite to the sharp edged wedge 7*a* intermediate the wedge-shaped support 7*b*, 7*c* along a line 8 perpendicular to the illustrated plane of FIG. 3. The bending stress produces a tensile stress that is effective perpendicular to the desired break surface and, in the same manner as the bending stress, reaches its maximum along the line 8. The breakage process itself takes its course such that, initially, there is applied on the piece 1 a bending stress and a tensile stress associated therewith via the compressive force $F_5$ produced via the sharp edged wedge 7*a*, and the wedge-shaped supports 7*b*, 7*c*. As described, the maximum of the tensile stress lies in the line 8. If now, in connection with this stress condition, the actual break forces $F_3$, $F_3'$ are applied to the piece 1—these forces being effective, in the same manner as the tensile stress, perpendicular to the break surface—a tear is initiated on the line 8—that is, in the region of the maximum bending stress and the consequent maximum tensile stress—with the tear developing along the break surface and thus along the break line 3, whereby the maximum bending stress and the consequent maximum tensile stress wander together into the peak of the tear and thus reinforce the tear so that the tear always runs along the stress maximum, whereby a wandering away of the tear can be substantially prevented.

It is to be understood that, as well, in connection with the afore-described bending assembly, the possibility exists to apply the compressive force $F_5$ and the opposition forces $F_5'$ and $F_5''$ dynamically on the piece 1; as well, in this event, this is to be accomplished such that the produced bending stress and the resulting tensile stress consequent thereto reach their maximums substantially contemporaneously with the achievement of the maximum of the break forces $F_3$, $F_3'$ applied on the piece 1.

In an enhancement to the above-described process, the breakage can, of course, also be aided via the disposition in conventional manner of grooves along the desired break line. The grooves are applied in a known manner, such as, for example, via melting of the top surface of the piece to be subjected to break separation by means of a laser beam, via mechanical scratches, via structure transformation, and so forth and, to support the breakage, such grooves can in particular be provided on ductile materials such as, for example, ductile beams as such are used, for example, in connection with forged piston rods.

The production of the above-noted grooves can also be advantageously achieved in connection with the arrangement described with respect to FIG. 1 if the application of the compressive forces $F_1$, $F_1'$ are configured such that, as illustrated in FIG. 4, the cuts 9*a*, 9*b* of the wedges 2*a*, 2*b* penetrate into the top surface of the piece 1, whereupon, in addition to the desired stress condition, a groove that favors the release of a tear occurs.

As noted, the afore-described examples of the method for break separation of the present invention are exemplary only. The deployment of known processes and media by one of ordinary skill in the art will permit the inventive method to be implemented in a range of imaginable circumstances.

The specification incorporates by reference the disclosure of German priority document DE 10 2004 020 063.7 filed Apr. 24, 2004.

The present invention is, of course, in no way restricted to the specific disclosure of the specification and drawings, but also encompasses any modifications within the scope of the appended claims.

What is claimed is:

1. A method for break separation of pieces that can be re-assembled or their starting materials, whereby the piece or its starting materials is to break separate at a selected break surface, the method comprising:

applying to a piece to be subjected to break separation a break force perpendicular to the selected break surface; and before the time at which the piece is subjected to the break force, applying a non-deforming compressive force to the piece perpendicular to said break force to induce a tensile stress, wherein said tensile stress is aligned to the break force and thereby supports the break force, wherein the tensile stress has a maximum that occurs in the plane of the selected break surface perpendicular to the break surface, such that the level of stress produced is still below the elastic limit of the material of the piece such that the piece does not undergo a material deformation as a result of the break separation, wherein the compressive force is applied to the piece that is to subjected to break separation by means of wedges or shear plates that simultaneously act upon the perimeter line of the selected break surface in a pointwise or linear manner with a sharp tip or edge, wherein said wedges or shear plates face one another on opposite sides of the selected break surface, wherein the compressive force continues at least until the piece is first subjected to the break force, and wherein sub-pieces formed from the break separation are configured to be reassembled by being re-fitted together along corresponding edges of said break surface.

2. A method according to claim 1, which further includes, prior to said step of applying a break force, the step of disposing a groove along at least a portion of a desired break line of a piece to be subjected to break separation by at least one of a mechanical groove inscribing method and a structure transformation method.

3. A method according to claim 1, wherein the step of applying a compressive force to the piece includes applying a compressive force via a static compressive loading on the piece, whereby the compressive force is effective in at least one of in the plane of the piece and a direction parallel to the plane of the piece.

4. A method according to claim 1, wherein the step of applying a compressive force to the piece includes engaging the piece with a shear edge of one of the shear plates extending along a portion of the perimeter line of the selected break surface in the direction of a first end of the piece and engaging the piece with a shear edge of the other shear plate extending along a portion of the perimeter line of the selected break surface in opposition to the shear edge of the one shear plate in the direction of a second end of the piece while the piece is secured against tipping, whereupon such a shear arrangement produces a compressive stress lying in the plane of the selected break surface and a tensile stress effective in a direction perpendicular to the compressive stress.

5. A method according to claim 1, wherein the step of applying a compressive force via the sharp edged wedge includes applying at least one of the sharp edged wedge and the wedge in a manner such that the respective wedge penetrates the piece.

6. A method according to claim 1, wherein the part of a desired break line that is acted upon by the wedges or shear plates is as great as possible, measured along the entire length of the desired break line.

* * * * *